United States Patent
Ozana (10) Patent No.: US 7,877,679 B2
(45) Date of Patent: Jan. 25, 2011

(54) SYSTEM AND METHOD FOR GENERATING A USER PROFILE FROM LAYERS BASED ON PRIOR USER RESPONSE

(75) Inventor: Avihai Ozana, Ramat-Gan (IL)

(73) Assignee: Amadesa Ltd., Ramat-Gan (IL)

( * ) Notice: Subject to any disclaimer, the term of this patent is extended or adjusted under 35 U.S.C. 154(b) by 1244 days.

(21) Appl. No.: 11/381,660

(22) Filed: May 4, 2006

(65) Prior Publication Data

US 2006/0259483 A1    Nov. 16, 2006

Related U.S. Application Data

(60) Provisional application No. 60/678,127, filed on May 4, 2005.

(51) Int. Cl.
  *G06F 17/30* (2006.01)
(52) U.S. Cl. ............ 715/221; 715/222; 715/223; 715/224
(58) Field of Classification Search ............ 715/224, 715/226
See application file for complete search history.

(56) References Cited

U.S. PATENT DOCUMENTS

| | | | | |
|---|---|---|---|---|
| 5,704,029 A | * | 12/1997 | Wright, Jr. | 715/223 |
| 5,805,159 A | * | 9/1998 | Bertram et al. | 715/764 |
| 6,084,585 A | * | 7/2000 | Kraft et al. | 715/733 |
| 6,295,061 B1 | * | 9/2001 | Park et al. | 715/764 |
| 6,618,746 B2 | * | 9/2003 | Desai et al. | 709/204 |
| 6,701,441 B1 | | 3/2004 | Balasubramaniam et al. | |
| 6,950,983 B1 | * | 9/2005 | Snavely | 715/206 |
| 6,981,028 B1 | | 12/2005 | Rawat et al. | |
| 7,051,273 B1 | * | 5/2006 | Holt et al. | 715/226 |
| 7,337,127 B1 | * | 2/2008 | Smith et al. | 705/14 |
| 7,689,924 B1 | * | 3/2010 | Schneider | 715/764 |
| 7,716,322 B2 | * | 5/2010 | Benedikt et al. | 709/224 |
| 2002/0035486 A1 | * | 3/2002 | Huyn et al. | 705/3 |
| 2003/0023754 A1 | | 1/2003 | Eichstadt et al. | |
| 2004/0210820 A1 | * | 10/2004 | Tarr et al. | 715/500 |
| 2005/0014117 A1 | * | 1/2005 | Stillman | 434/322 |
| 2005/0183003 A1 | * | 8/2005 | Peri | 715/507 |
| 2005/0198120 A1 | | 9/2005 | Reshef et al. | |
| 2005/0198212 A1 | * | 9/2005 | Zilberfayn et al. | 709/219 |
| 2006/0168509 A1 | * | 7/2006 | Boss et al. | 715/507 |
| 2008/0072170 A1 | * | 3/2008 | Simons | 715/769 |

OTHER PUBLICATIONS redhat.com.

(Continued)

*Primary Examiner*—Stephen S Hong
*Assistant Examiner*—I-Chan Yang
(74) *Attorney, Agent, or Firm*—Fish & Richardson P.C.

(57) ABSTRACT

A method for optimizing forms includes generating a profile of a user of a web browser on a client computer and loading into the web browser a vendor form including a field to be filled in with information provided by the user. The form also includes a tag invoking a script-based engine. Software code is stored corresponding to a plurality of layers containing interactive instructions for assisting the user in filling in the field. Responsively to the tag, the script-based engine is loaded into the web browser. Responsively to at least one profile parameter of the user, a portion of the software code is selected and downloaded to the web browser, so that a layer from among the plurality of layers is displayed by the web browser. Via the displayed layer, input is received from the user for filling in the field.

11 Claims, 3 Drawing Sheets

OTHER PUBLICATIONS apache.org.
mysql.com.
developer.com.
U.S. Appl. No. 60/678,127.

* cited by examiner

SYSTEM AND METHOD FOR GENERATING A USER PROFILE FROM LAYERS BASED ON PRIOR USER RESPONSE

CROSS-REFERENCE TO RELATED APPLICATION

This application claims the benefit of U.S. Provisional Patent Application 60/678,127, filed May 4, 2005, which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to web content distribution, and specifically to methods and systems for presenting effective web-based forms.

BACKGROUND OF THE INVENTION

Forms are utilized by many websites to register members or to sell products. Users who visit a website generally view the process of completing forms as being time consuming, and users may abandon the process for a variety of reasons that are difficult for website operators to discern. For website operators, abandonment by users means missed registration or missed sales.

Several methods for improving the process of completing web-based forms are known in the prior art. For example, U.S. Pat. No. 6,981,028 describes a system whereby a user's personal information is stored in a central database and may be accessed by a membership website. Registration forms associated with opening a new membership or account may be completed automatically from the stored personal information. The system may be adapted to recognize that information that has not been recorded is needed for a new registration and to prompt the user for the needed information. The automated form completion feature is not limited to registration forms and may be adapted to access recorded user data to complete virtually any type of form a user is likely to encounter.

U.S. Patent Publication 2005/0198120 provides a method of integrating multiple web sites that provide services, such that users accessing a host web site are presented with content from the multiple service sites. The content from the multiple service sites is determined by marking web pages from the server sites with tags indicating the content within each page that is to be presented. A host web page presents the content from the server sites and determines the manner in which the content is presented.

SUMMARY OF THE INVENTION

Embodiments of the present invention that are described hereinbelow provide a system, apparatus, and methods for presenting effective web-based forms, which may be customized according to a profile of a user.

In some embodiments of the invention, a vendor configures a website to generate a form, referred to hereinbelow as a vendor form, which is designed to acquire information over the Internet from a user. Upon receiving a completed form from the user, the website implements an appropriate transaction, such as a product sale or, in the case of a dating service, a match. A customizable form, adapted to suit a profile of the user, assists the user in completing the vendor form.

A customization server, which typically is operated by an Application Service Provider (ASP), provides the customizable form to a user's web browser. The customizable form is typically divided into several sections, referred to hereinbelow as layers. The ASP designs each layer to comprise one or more questions that correspond to a subset of questions on the vendor form, and the ASP may provide several alternative layers for each given subset of questions. Each alternative layer is configured to suit a given user profile, or range of user profiles.

A user profile may be assembled from responses that the user provides while completing the customizable form. Such responses may include age, gender, personal interests or pastimes (for a dating service), and financial information (for a banking service). Additionally or alternatively, the user profile may comprise accumulated information about the user's website interaction, such as the user's prior experience with the website, or a user's adeptness, which may be indicated by the user's reliance on on-line help, his tendency to make errors, or the speed at which he responds to questions.

A script-based, software engine, typically comprising JavaScript code, is loaded into the user's web browser and operates in conjunction with the customization server to select appropriate layers to present to the user, based on the user profile. The script-based engine also manages an incremental process of updating the user profile based on the user's responses and the user's interaction.

Customization of layers to suit the user typically comprises customization of graphics, text, and/or audio, as well as customization of the level of detail in instructions that are presented.

Because the layers are adapted to suit the user, the user is more likely to complete the form, and to do so correctly. In addition, aggregated data on user interaction, including statistics on whether certain form questions cause users to pause or abandon the form, may be used to fine tune the layers and the profiles. The tuning process optimizes the customizable forms to improve the rate of form completion.

There is therefore provided, in accordance with an embodiment of the present invention, a method for optimizing forms, the method including:

generating a profile of a user of a web browser on a client computer, the profile including one or more profile parameters;

loading into the web browser a vendor form including at least one field to be filled in with information provided by the user and a tag invoking a script-based engine;

storing software code corresponding to a plurality of layers containing interactive instructions for assisting the user in filling in at least one field;

responsively to the tag, loading the script-based engine into the web browser;

selecting and downloading to the client computer, using the script-based engine, responsively to at least one of the profile parameters of the user, a portion of the software code so that a layer from among the plurality of layers is displayed by the web browser; and receiving, via the displayed layer, an input from the user for filling in at least one field on the vendor form.

Generating the profile generally includes setting a profile parameter according to the input received from the user via a first layer, and selecting and downloading the portion of the software code may include selecting the portion of the software code for display of a second layer responsively to the profile parameter. Generating the profile also may include setting a further profile parameter according to the input received from the user via the second layer.

Selecting the portion of the software code may include choosing between at least first and second layers for display in conjunction with a given field of the vendor form responsively to a value of at least one of the profile parameters of the user. In some embodiments, the value is indicative of at least one of an age, gender, personal interest, and financial status of the user.

Generating the profile of the user may also include assessing an adeptness of the user in interacting with the web browser, and setting at least one of the profile parameters according to a measure of the adeptness. Selecting the portion of the software code typically includes setting an aspect of at least one of graphics, text, and sound in the layer responsively to the adeptness of the user. The method may also include aggregating a statistic with respect to the adeptness of a plurality of users and setting an aspect of at least one of graphics, text, and sound in the layer responsively to the statistic.

There is also provided, in accordance with an embodiment of the present invention, a customizing server, including:

a network interface, which is configured to communicate over a network with a web browser on a client computer, which is coupled to receive via the network a vendor form including at least one field to be filled in with information provided by the user and a tag invoking a script-based engine;

a memory, which is arranged to hold a profile of a user of the web browser, the profile including one or more profile parameters, and to hold software code corresponding to a plurality of layers containing interactive instructions for assisting the user in filling in at least one field; and a processor, which is coupled to the network interface and the memory, and which is operative, responsively to the tag, to load the script-based engine into the web browser, and to download to the client computer, using the script-based engine, a portion of the software code that is selected responsively to at least one of the profile parameters of the user, so that a layer from among the plurality of layers is displayed by the web browser, and which is configured to receive, via the displayed layer, an input from the user for filling in at least one field on the vendor form.

There is also provided, in accordance with an embodiment of the present invention, a customizing server, including:

a computer-readable medium in which program instructions are stored, which instructions, when read by a server computer in communication via a network with a web browser on a client computer, which is coupled to receive via the network a vendor form including at least one field to be filled in with information provided by the user and a tag invoking a script-based engine, cause the server computer to maintain a profile of a user of the web browser, the profile including one or more profile parameters, and to hold software code corresponding to a plurality of layers containing interactive instructions for assisting the user in filling in at least one field, wherein the instructions further cause the server computer, responsively to the tag, to load the script-based engine into the web browser, and to download to the client computer, using the script-based engine, a portion of the software code that is selected responsively to at least one of the profile parameters of the user, so that a layer from among the plurality of layers is displayed by the web browser, and to receive, via the displayed layer, an input from the user for filling in at least one field on the vendor form.

The present invention will be more fully understood from the following detailed description of the embodiments thereof, taken together with the drawings in which:

DETAILED DESCRIPTION OF EMBODIMENTS

In the embodiments of the present invention that are described below, a vendor form is loaded to a web browser from a vendor website. Subsequently, the vendor form is overlaid by a customizable form. Customization may be based on a user profile.

Figure 1A:
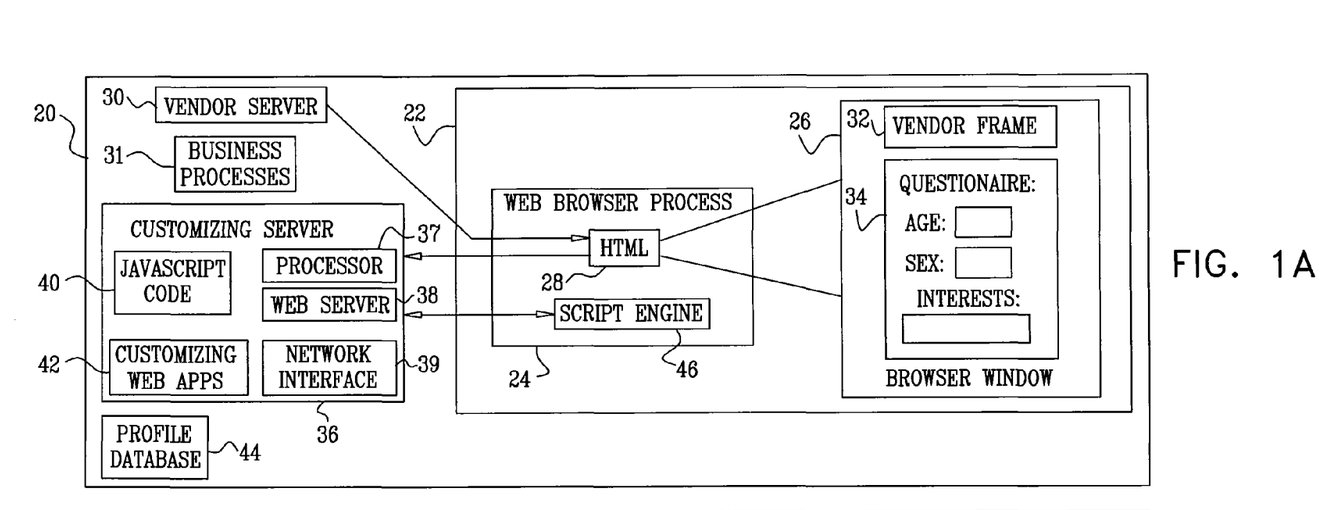
FIGS. 1A and 1B are block diagrams that schematically illustrate a system for generating and presenting customized web-based forms, in accordance with an embodiment of the present invention.

FIG. 1A is a schematic illustration of a system 20 for generating and presenting customizable forms, in accordance with an embodiment of the present invention. A client computer 22, operated by a user, executes a web browser process 24. The web browser process creates a browser window 26 that is viewable by the user. Through browser window 26, the user navigates the Internet by entering Uniform Resource Locators (urls) of desired websites.

A vendor website operated in accordance with an embodiment of the present invention runs on a vendor server 30. When the user navigates to the vendor website, web browser process 24 communicates with vendor server 30 by means of Hypertext Transfer Protocol (HTTP) requests and responses. Vendor server 30 is typically a server platform running a web server such as Microsoft Internet Information Server (IIS), Sun ONE Web Server, Netscape Enterprise Server, iplanet Web Server, or Apache Web Server.

In response to the HTTP communication, vendor server 30 transmits a Hypertext Markup Language (HTML) page 28 to web browser process 24. A graphical representation of HTML page 28, generated by web browser process 24, typically includes a vendor banner or frame 32. Frame 32 provides a consistent look to all web pages accessible on the vendor's website. HTML page 28 also includes a vendor form 34, which may be a registration form through which the user registers for a service provided by the website. Typically, vendor form 34 comprises multiple questions, which may extend over one or more web pages. For example, a vendor form for a dating service may comprise questions regarding a user's age, or age range, gender, height, income bracket, and favorite pastime. Additionally or alternatively, vendor form 34 may be a purchase form, through which the user provides information indicating a desired product and a means of payment.

When vendor form 34 is completed, as described further hereinbelow, vendor server 30 receives the completed form and executes business processes 31, which typically run in software that may be installed on vendor server 30 or on an external enterprise server. Business processes 31 perform appropriate transactions, such as recording a product sale or determining a prospective match for the user.

In an embodiment of the present invention, HTML page 28 includes a command to retrieve a JavaScript code 40 from a customizing server 36. A typical code retrieval command appears within HTML page 28 as follows:

Code Listing 1:

```
<script src=
    "<server>/<path>/<application>?<vendor-
    parameters>" language="JavaScript">
</script>
```

The "src" attribute indicates that a call is to be made to <server>, this being an Internet Protocol (IP) number or domain name of the customizing server. The <path> is the path to a directory of JavaScript code on the customizing server, and <application> is the name of the JavaScript code to be retrieved. The <vendor-parameters> identify the vendor.

Typically, customizing server 36 is operated by an Application Service Provider (ASP) that provides form customization to the vendor on a fee basis. Customizing server 36 comprises a processor 37 running an operating system that may be a version of Linux, such as Red Hat Enterprise Linux, available from www.redhat.com. Alternatively, the processor 37 may run other Unix-based operating systems, or may run Microsoft windows-based operating systems. A web server 38 runs over the operating system. The web server may comprise a version of Apache Web Server configured with Apache Tomcat software. Both the Apache Web Server and the Apache Tomcat software are available from the Apache Software Foundation at www.apache.org. Web server 38 may also comprise alternative web servers such as those noted above with respect to vendor server 30, such web servers being similarly configured with, or embedded with, servlet engine functionality similar to that of Apache Tomcat.

The web server supports customizing web applications, referred to hereinbelow as web apps 42, which perform the novel functions of website customization that are described herein. The web apps may be downloaded to server 36 in electronic form, over a network, for example, or they may alternatively be provided on tangible media, such as optical, magnetic, or electronic storage media. Web apps 42 provide business logic functions and store and retrieve data from a memory holding profile database 44. Three software listings, amtargeting, amexecute, and amcookie, shown below in the Appendix under Code Listing A1, provide key functionality of web apps 42 for storing and retrieving layers and profiles from profile database 44.

Figure 2A:
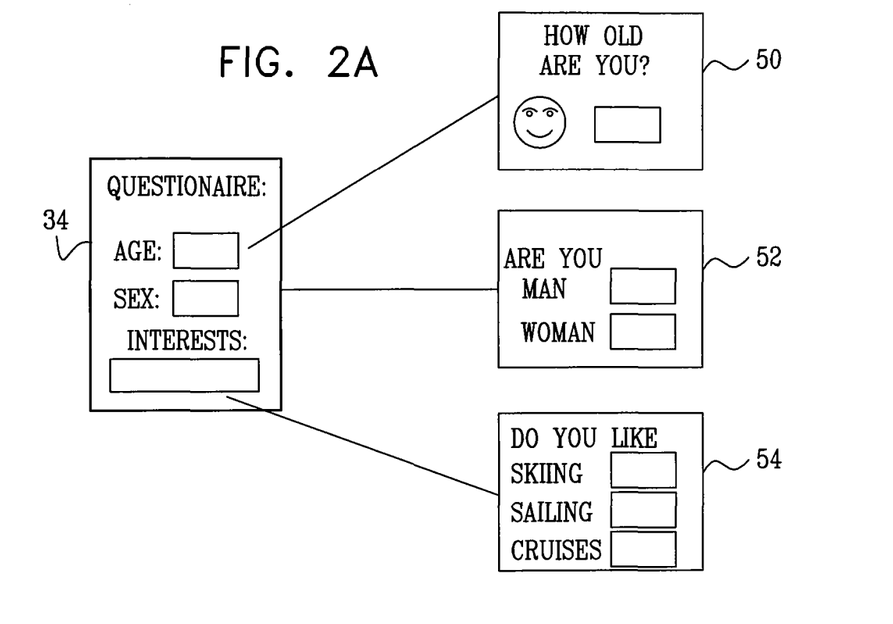
FIGS. 2A and 2B are schematic illustrations of browser windows presenting customized layers of a web-based form, in accordance with an embodiment of the present invention.
Figure 2B:
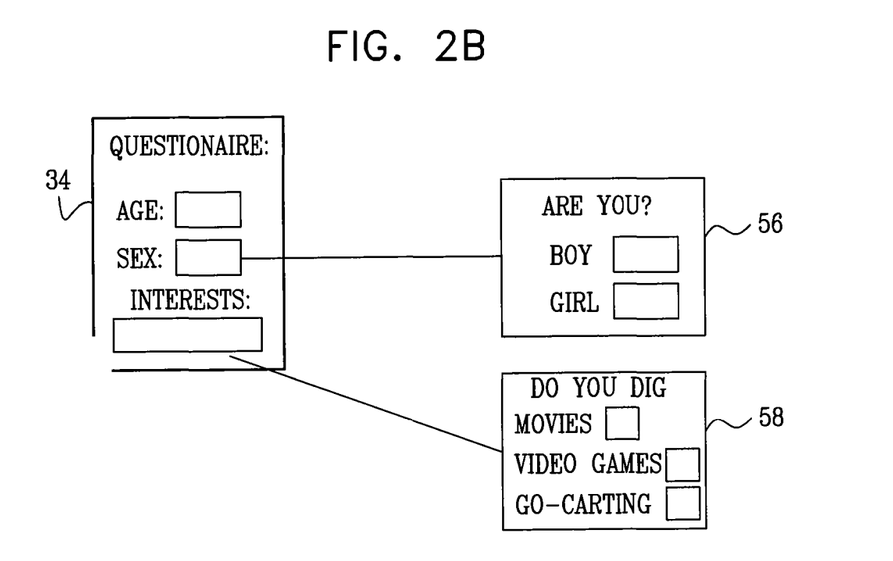

The storage media of profile database 44 may use any known technology for computer storage, such as optical, magnetic, or electronic media, including, but not limited to magnetic hard disk and random access memory (RAM) storage. The profile database stores profiles of users who visit the vendor website. The profile database also stores customizable forms, including layers and layer profiles, as described further hereinbelow (FIGS. 2A and 2B). Operation of the web apps and of the profile database are described further hereinbelow.

Customizing server 36 is connected by means of a network interface 39 to the Internet. In response to the code retrieval command (Code Listing 1), the customized server provides JavaScript code 40 to web browser process 24.

The JavaScript code retrieved from customizing server 36 comprises a script-based engine 46 that begins running once it is loaded into web browser process 24. Being written in JavaScript, the script-based engine can run on a wide range of web browsers, including Microsoft Internet Explorer and Mozilla Firefox, and can operate with a high level of security, because JavaScript applications have limited access to components of the client computer. Web browsers also cache JavaScript code, thereby improving the speed of execution.

The operation of script-based engine 46 is described further hereinbelow.

Figure 1B:
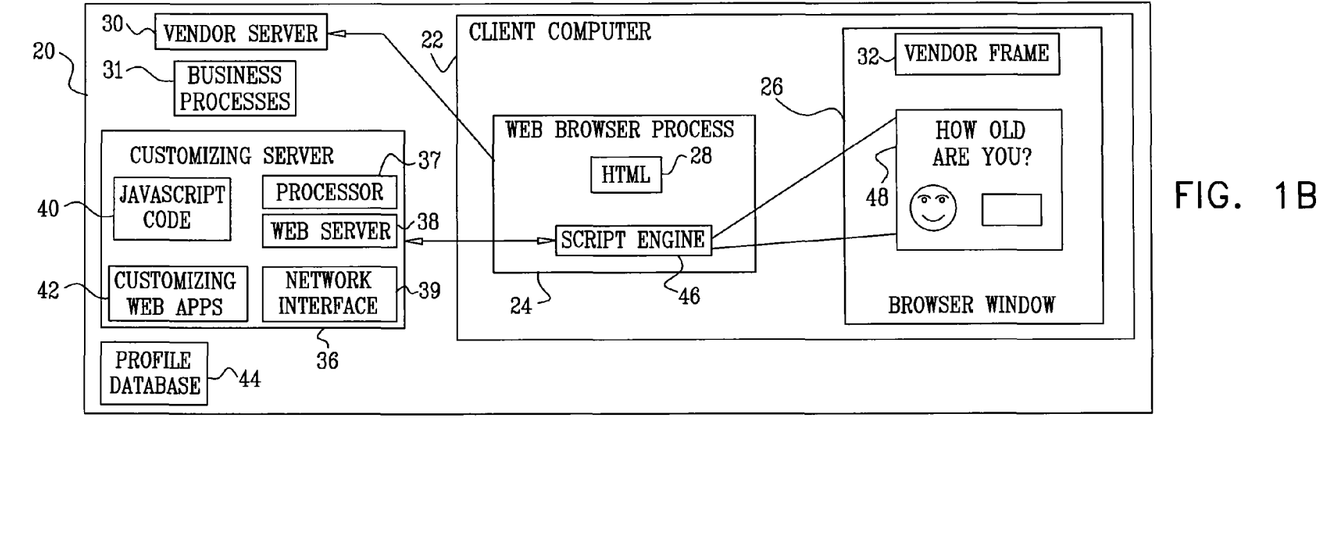

FIG. 1B illustrates the presentation of a customizable form 48, in accordance with an embodiment of the present invention. Script-based engine 46 manages the presentation of customizable form 48 and the tracking of a user's interaction with the form. Script-based engine 46 retrieves customizable form 48, based on its associated vendor form 34, from customizing server 36. Script-based engine 46 then positions customizable form 48 graphically within browser window 26 so as to cover the position intended for vendor form 34.

Typically, the script-based engine hides HTML page 28 by performing the command:

Code Listing 2:

```
document.forms[0].style.visibility = "hidden";
or, alternatively,
document.body.style.visibility = "hidden";
```

Consequently, the user does not see vendor form 34, and instead sees customizable form 48, as described below.

FIGS. 2A and 2B schematically illustrate layers of customizable form 48, in accordance with an embodiment of the present invention. Customizable form 48 comprises multiple layers, each layer representing a customized presentation of one question from the vendor form. Layers are designed in standard HTML format and are presented by a JavaScript command such as the following:

Code Listing 3:

```
document.body.insertAdjacentHTML("afterBegin",layer1);
```

The layer itself, named "layer 1" in this example, is typically defined as a string comprising HTML-formatted code. An example of a layer configured with a button and a form field, or edit box, is as follows:

Code Listing 4:

```
var layer1 =
"<DIV       style="VISIBILITY:     hidden;     POSITION:
absolute">
<DIV      id=amCtrl:editBox1      style="LEFT:      73px;
VISIBILITY: visible; WIDTH: 100px; CURSOR: auto;
POSITION: relative; TOP: 11px; HEIGHT: 20px"
pos_rel="true">
<INPUT onkeyup=amDialog.editBox1.onKeyUp( )
style="WIDTH: 100%; HEIGHT: 100%"
name=am:editBox1></DIV></DIV>
<DIV       style="VISIBILITY:     hidden;     POSITION:
absolute">
<DIV id=amCtrl:button2 style="LEFT: 252px;
VISIBILITY: visible; WIDTH: 100px; CURSOR: auto;
POSITION: relative; TOP: 83px; HEIGHT: 20px"
pos_rel="true">
```

-continued

```
<INPUT class=" " style="WIDTH: 100%; HEIGHT: 100%"
onclick=amDialog.continueExecuted( ) type=button
value=Button name=am:button2></DIV></DIV>"
```

Typically, when script-based engine 46 begins to run, it loads data in XML format from the profile database. The data comprises the definitions of all layers of the customizable form and the profile logic defining the correspondence between profile parameters and each layer. XML data is loaded from the profile database using a loading function such as amGetXmlObject defined as follows:
Code Listing 5:

```
function amGetXmlObject(xmlUrl)
{
    var xmlDoc;
    try
    {
        var xmlDoc = new
        ActiveXObject("Microsoft.XMLDOM");
        xmlDoc.async = false;
        xmlDoc.load(xmlUrl);
    }
    catch(e)
    {
        alert(e.decription);
    }
    return xmlDoc;
}
```

The loading function is executed using a JavaScript command such as the following:
Code Listing 6:

```
var xmlItem =
amGetXmlObject("http://srv.amadesa.com/xmlFile.xml")
```

After loading the layers and presenting an initial layer, the script-based engine monitors the user's responses to set parameters of a user profile. In one embodiment, parameters of a profile, both for a user and for a layer, are stored as a multi-dimensional vector. A selection of a given layer to display is made by matching the vector of the layer profile to the user profile vector. If no layer has a matching vector, a least-squares fit is performed to identify the closest matching vector.

FIG. 2A indicates the correspondence of layers of customizable form 48 to questions in the vendor form. For example, if the website provides a dating or matching service, the vendor form may require the user to answer questions regarding personal information, including age, gender, and interests. A first layer 50 of customizable form 48 may present an age question, corresponding to the age question in the vendor form. A second layer 52 may present a gender question, corresponding to the respective vendor form gender question. A third layer 54 may correspond to the question about interests. As each layer is presented within browser window 26, the user enters an appropriate response, after which the subsequent layer is presented.

FIG. 2B indicates how alternative layers may be presented depending on user responses. For example, second layer 52 of FIG. 2A may be appropriate for a user who is determined to be over twenty years old, based on the user's response to the age question of first layer 50. An alternative second layer 56 may be presented instead, if the user is determined to be under twenty. Similarly, an alternative third layer 58 may be presented instead of third layer 54 if the user is under twenty and a male. Alternative layers may vary in several aspects, such as their use of vernacular, their graphics, and their layout. Alternative layers may also differ in the amount and type of instructions that they provide to the user.

As may be understood from the foregoing description, parameters of a profile may be determined based on the user's responses to questions. In addition, profile parameters may be determined based on the manner in which the user interacts with the customizable form, also referred to hereinbelow as a user's adeptness. For example, upon presenting a layer, the engine may start a timer to measure the speed at which a user answers the question (or multiple questions) on the layer. The engine may also track the user's adeptness in terms, for example, of the number of times that the user enters erroneous values into a field, whether the user clicks on a help button, and whether a user stops at a given question. The engine records measures of adeptness as parameters of the user profile, and these parameters are also used to determine the subsequent layers presented in the customizable form. For example, the level of detail in a layer may be set according to profile parameters indicating a user's adeptness, such that the engine presents an adept user with fewer instructions on each layer and presents a less adept user with relatively more instructions. Measures of adeptness aggregated for many users may also provide statistics for analyzing and tuning the customizable form to improve the form's effectiveness.

Typically, the ASP operating customizing server 36 develops layers to suit all profiles that may warrant special customization. The ASP stores these layers in profile database 44. Profile database 44 may be any database readily available, such as a MySQL database, available from www.mysql.com.

Figure 3:
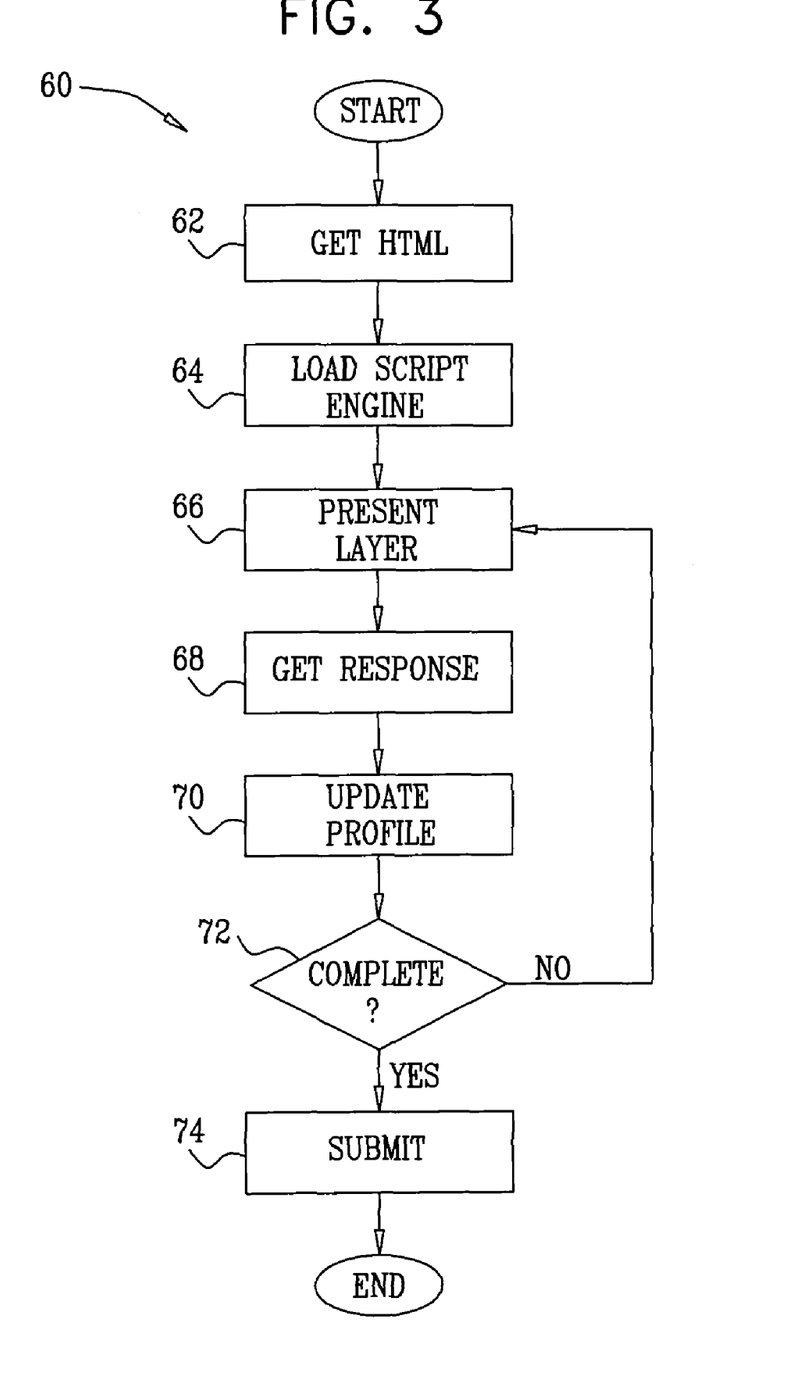
FIG. 3 is a flow diagram of a process for generating and presenting customized web-based forms, in accordance with an embodiment of the present invention.

FIG. 3 is a flow diagram of a process 60 for presenting customizable forms, in accordance with an embodiment of the present invention.

Process 60 is initiated when a user navigates to a vendor website, as described above. At an initial step 62, HTML page 28 from vendor server 30 is downloaded to web browser process 24. At a subsequent step 64, script-based engine 46 is loaded to the web browser process, from customizing server 36, in response to the code retrieval command shown above (Code Listing 1).

After being loaded, script-based engine 46 retrieves at a step 66 one or more layers of the customizable form to present in place of vendor form 34. If a profile of the user exists in profile database 44 and the user can be identified, for example by a cookie on client computer 22, then the first custom layer may be selected based on the given profile. If, on the other hand, no previous profile exists or no identification can be made, then the first layer presented is a generic first layer comprising the first question.

After presenting the layer, the script-based engine sets a timer to measure the speed at which the user responds, as well as to determine whether a user has abandoned the form. Typically, the layer is programmed to monitor the user's interaction, reacting to events such as the user's triggering of on-line help and his errors. When such events occur, the layer calls an appropriate function in the script-based engine to record the interaction event. The interaction is subsequently evaluated to determine profile parameters indicating user adeptness. Functions in the script-based engine that record the interaction events and update profile parameters are shown in Code Listing A2 in the Appendix.

At a step 68, the user responds to the question presented by the layer. At a subsequent step 70, the user response is used to update parameters of the user's profile, which is stored in profile database 44. Functions of the script-based engine that present a layer and update profile parameters are shown in Code Listing A3 in the Appendix.

The manner of the user's interaction, as described above, is also used by script-based engine 46 to update parameters of the user's profile. If the user fails to respond at step 68, effectively abandoning the form after a given amount of time, then the fact that abandonment occurred at a certain layer is also stored in the profile database at step 70. Information about layer abandonment and other measures of adeptness are subsequently aggregated from multiple user interactions. Aggregated statistics may then be used by the ASP to optimize the customizable form, so as to improve completion rates. For example, statistics may indicate which layers have a propensity to cause user error or abandonment, thereby allowing the ASP to focus his attention on reducing problems within certain layers. In some embodiments, customizing server 36 is further configured to automatically modify customizable forms based on aggregated statistics. For example, the customizable server may be configured to test a new layer for a certain number of users and to revert to using an old layer if the new layer causes more errors or greater abandonment.

Also at step 70, script-based engine 46 assigns a value to the corresponding field of HTML page 28 associated with the vendor form. The assignment is performed using the JavaScript command:

Code Listing 7:

```
document.getElementsByName("age")[0].value = "age";
```

By assigning values to the vendor form, the script-based engine is able to complete and subsequently to submit the vendor form, so that the operation of the customizable form is transparent to the vendor server.

Because user interaction may be tracked in real-time, as described above by script-based engine 46, step 70 may also be performed at certain time intervals, even while the user is still considering a response. Interaction between script-based engine 46 and web server 38 typically utilizes Asynchronous JavaScript XML (AJAX) communications techniques known in the art. AJAX techniques are described in more detail, for example, by Wei in an article entitled "AJAX: Asynchronous Java+XML?," published by developer.com (2006), at www.developer.com/design/article.php/3526681, whose disclosure is incorporated herein by reference.

Once updated profile parameters are established at step 70, the updated profile is used to determine a subsequent layer to be presented to the user. For example, as described above with respect to FIGS. 2A and 2B, if the first question requests the user's age, then the age provided by the user's response will determine the appropriate language and the graphics to be provided on the second layer. The determination of the subsequent layer may be made either by business logic programmed in the script-based engine or programmed in web apps 42. In one embodiment, the determination may be made by matching a profile vector of the user to a layer profile vector as described above.

After each layer presentation, a determination is made at an iteration step 72 as to whether or not the form has been completed. The determination to continue, like the determination of a subsequent layer, may be made either by business logic programmed in the script-based engine or programmed in web apps 42. As noted above, a decision also may be made that a user having difficulty should not be presented with all possible questions.

If more questions are to be presented, process 60 is repeated from step 66. If no more questions are to be presented, then the process continues to a submit step 74. At this step, the script-based engine implements a form submission command of the HTML page, thereby returning to vendor server 30 a standard form response, comprising values of completed fields.

The form is submitted using the JavaScript command:
Code Listing 8:
document.forms[0].submit( );

As noted above, the form is submitted as it would have been submitted without the interaction of the script-based engine.

After form submission, process 60 is complete.

Although the embodiments described above relate specifically to the completion of web-based forms, the principles of the embodiments described may be implemented in conjunction with other web-based interfaces that provide means for user interaction. For example, interactive help provided by a website may also be supported by customized layers. Furthermore, it should be appreciated that embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for generating a user profile, of a user of a web browser, the user profile including a plurality of profile parameters, the method comprising:
    employing a tag to load a script-based engine into the web browser;
    employing the script-based engine to download from a server to the web browser, data comprising definitions of a plurality of HTML layers of a customizable form and profile logic defining correspondence between said plurality of profile parameters and each of the plurality of HTML layers;
    subsequently, employing said script-based engine to utilize said plurality of HTML layers and said profile logic:
        to cause said web browser to display one of said plurality of HTML layers to the user;
        to monitor at least one user response to at least one query in said one of said plurality of HTML layers, wherein said at least one user response comprises an adeptness assessment of the user in interacting with the web browser; and
    based on said at least one user response:
        to set at least one parameter of said plurality of profile parameters of said user profile; and
        to select a subsequent HTML layer to be displayed, by the web browser, from among said plurality of HTML layers already downloaded to said web browser, wherein a subsequent HTML layer with a higher level of detail is selected for a user profile indicating a higher adeptness assessment and a subsequent HTML layer with a lower level of detail is selected for a user profile indicating a lower adeptness assessment.

2. The method according to claim 1, wherein the subsequent HTML layer to be displayed comprises one of at least first and second alternative HTML layers, each of said at least first and second alternative HTML layers being associated with a given value of said at least one user response.

3. The method according to claim 2, wherein the value is indicative of at least one of an age, gender, personal interest, and financial status of the user.

4. The method according to claim 1, wherein said to select a subsequent HTML layer comprises to set an aspect of at least one of graphics, text, and sound in the HTML layer based on said adeptness assessment.

5. The method according to claim 1, and further comprising aggregating a statistic with respect to the adeptness assessments of a plurality of users and setting an aspect of at least one of graphics, text, and sound in the HTML layer based on the statistic.

6. The method according to claim 1, wherein said one of said plurality of HTML layers comprises a generic HTML layer.

7. A system for generating a user profile, of a user of a web browser, the user profile including a plurality of profile parameters, the system comprising:
   a client computer including a web browser; and
   at least one server including;
      a network interface, which is configured to communicate over a network with said web browser, said web browser being coupled to receive via the network a tag invoking a script-based engine;
      a memory, which is arrange to hold said user profile, data comprising definitions of a plurality of HTML layers of a customizable form and profile logic defining correspondence between said plurality of profile parameters and each of said plurality of HTML layers; and
      a processor, which is coupled to the network interface and the memory, and which is operative, responsively to the tag:
         to load a script-based engine into the web browser; and
         to download from said at least one server to the client computer said data, in response to a request from the script-based engine,
      said web browser being operative to subsequently, employ said script-based engine to utilize said plurality of HTML layers and said profile logic:
         to cause said web browser to display one of said plurality of HTML layers to the user;
         to monitor at least one user response to at least one query in said one of said plurality of HTML layers, wherein said at least one user response comprises an adeptness assessment of the user in interacting with the web browser; and
      based on said at least one user response:
         to set at least one parameter of said plurality of profile parameters of said user profile; and
         to select a subsequent HTML layer to be displayed, by the web browser, from among said plurality of HTML layers already downloaded to said web browser, wherein a subsequent HTML layer with a higher level of detail is selected for a user profile indicating a higher adeptness assessment and a subsequent HTML layer with a lower level of detail is selected for a user profile indicating a lower adeptness assessment.

8. The system according to claim 7, wherein the script-based engine is operative to select the subsequent HTML layer by choosing between at least first and second alternative HTML layers, each of said first and second alternative HTML layers being associated with a given value of said at least one user response.

9. The system according to claim 8, wherein the value is indicative of at least one of an age, gender, personal interest, and financial status of the user.

10. The system according to claim 7, wherein the script-based engine is operative to measure an adeptness of the user in interacting with the web browser and to set a profile parameter according to the measure of adeptness.

11. The system according to claim 10, wherein the script-based engine is operative to determine an aspect of at least one of graphics, text, and sound in the displayed HTML layer based on the measure of adeptness.

* * * * *